(12) United States Patent
Yang et al.

(10) Patent No.: US 12,449,320 B2
(45) Date of Patent: Oct. 21, 2025

(54) ELECTROMAGNETIC ULTRASONIC DOUBLE-WAVE TRANSDUCER

(71) Applicant: SUZHOU PHASERISE TECHNOLOGY CO., LTD., Suzhou (CN)

(72) Inventors: Long Yang, Suzhou (CN); Mingming Xie, Suzhou (CN); Yisheng Jin, Suzhou (CN); Xinzong Zhou, Suzhou (CN); Junhui Zhao, Suzhou (CN); Xuxiang Zhu, Suzhou (CN); Yuping Shen, Suzhou (CN)

(73) Assignee: SUZHOU PHASERISE TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/586,433

(22) Filed: Feb. 24, 2024

(65) Prior Publication Data

US 2025/0052629 A1    Feb. 13, 2025

Related U.S. Application Data

(62) Division of application No. 17/266,127, filed as application No. PCT/CN2018/112179 on Oct. 26, 2018, now Pat. No. 11,959,817.

(30) Foreign Application Priority Data

Aug. 8, 2018 (CN) .......................... 201810893704.4

(51) Int. Cl.
*G01L 5/00* (2006.01)

(52) U.S. Cl.
CPC ...................................... *G01L 5/00* (2013.01)

(58) Field of Classification Search
CPC ....... G01N 29/24; G01N 29/2412; B06B 1/04
See application file for complete search history.

(56) References Cited

U.S. PATENT DOCUMENTS

| 4,063,157 A | 12/1977 | Lorenzi | G01N 27/82 |
| | | | 324/213 |
| 4,296,486 A | 10/1981 | Vasile | H04R 9/047 |
| | | | 367/140 |

(Continued)

FOREIGN PATENT DOCUMENTS

| CN | 104820024 A | 8/2015 |
| CN | 204854670 U | 12/2015 |

(Continued)

*Primary Examiner* — Tran M. Tran
(74) *Attorney, Agent, or Firm* — SZDC Law PC

(57) ABSTRACT

An electromagnetic ultrasonic double-wave transducer includes a shell (1), and a permanent magnet assembly, a coil (4), a shielding layer (5), and a wire (6) which are provided in said shell (1); said coil (4) is fixed on the bottom of said shell (1) and is located below said permanent magnet assembly; said shielding layer (5) is arranged between said permanent magnet assembly and said coil (4); one end of said wire (6) is connected to said coil (4) while the other end thereof is connected to the power supply and signal plug (7); said permanent magnet assembly includes a third permanent magnet (12) and a fourth permanent magnet (13); the upper end faces of said third permanent magnet (12) and said fourth permanent magnet (13) realize magnetic circuit closing by means of a magnetic circuit closing element (8).

5 Claims, 4 Drawing Sheets

(56) References Cited

U.S. PATENT DOCUMENTS

| | | | |
|---|---|---|---|
| 4,395,913 A | 8/1983 | Peterson | G01N 29/2412 310/313 A |
| 4,471,658 A * | 9/1984 | Morimoto | B06B 1/04 324/220 |
| 4,638,830 A * | 1/1987 | Brown | F15B 13/0438 137/83 |
| 5,050,703 A | 9/1991 | Graff | G01N 29/2412 181/106 |
| 5,148,414 A | 9/1992 | Graff | B06B 1/04 367/140 |
| 5,164,921 A | 11/1992 | Graff | G01N 29/2412 367/140 |
| 5,277,751 A | 1/1994 | Ogle | H01J 37/321 438/731 |
| 5,608,691 A * | 3/1997 | MacLauchlan | B06B 1/04 367/140 |
| 5,689,070 A | 11/1997 | Clark | B06B 1/04 73/643 |
| 5,811,682 A | 9/1998 | Ohtani | G01N 29/2412 73/622 |
| 5,900,793 A | 5/1999 | Katznelson | G01R 33/383 335/298 |
| 6,109,108 A | 8/2000 | Ohtani | B06B 1/04 73/599 |
| 6,125,706 A | 10/2000 | Buttram | G01N 29/42 73/643 |
| 6,176,132 B1 | 1/2001 | MacLauchlan | G01F 23/284 73/290 V |
| 6,640,635 B2 | 11/2003 | Nakatsuka | G01N 29/2412 73/579 |
| 6,766,694 B2 | 7/2004 | Hubschen | G01N 27/90 73/643 |
| 7,697,375 B2 | 4/2010 | Reiderman | E21B 47/16 73/642 |
| 7,726,193 B2 | 6/2010 | Reiderman | G01N 29/32 73/620 |
| 8,037,764 B2 | 10/2011 | Kroning | G01N 29/2412 324/238 |
| 8,037,765 B2 | 10/2011 | Reiderman | E21B 47/005 73/643 |
| 8,511,165 B2 | 8/2013 | Lopez Jauregui | G01N 29/07 381/338 |
| 8,596,129 B2 | 12/2013 | Niese | G01N 27/90 73/597 |
| 8,789,422 B2 * | 7/2014 | Ege | B06B 1/04 324/262 |
| 8,952,595 B2 * | 2/2015 | Huang | B06B 1/0292 367/181 |
| 9,983,073 B2 | 5/2018 | May | G01L 1/255 |
| 10,408,796 B2 * | 9/2019 | Bondurant | B06B 1/045 |
| 10,436,018 B2 | 10/2019 | Kouchmeshky | G01V 1/52 |
| 10,502,714 B2 | 12/2019 | Ren | G01N 29/2412 |
| 10,537,916 B2 * | 1/2020 | Cegla | B06B 1/08 |
| 10,591,443 B2 | 3/2020 | Lopatin | G01F 23/2966 |
| 11,385,115 B2 | 7/2022 | Walaszek | G01L 5/246 |
| 11,421,986 B2 | 8/2022 | Shen | G01N 29/2412 |
| 11,442,042 B2 | 9/2022 | Stanton | G01N 27/9006 |
| 11,493,581 B2 | 11/2022 | Han | H01F 7/064 |
| 2003/0011451 A1 | 1/2003 | Katznelson | G01R 33/383 335/216 |
| 2010/0274138 A1 * | 10/2010 | Mizunuma | G01S 15/8925 600/459 |
| 2011/0259108 A1 | 10/2011 | Ege | G01N 29/2412 73/643 |
| 2012/0103097 A1 * | 5/2012 | Lopez Jauregui | G01N 29/2412 73/643 |
| 2012/0240681 A1 | 9/2012 | Lopez Jauregui | G01N 29/4445 73/643 |
| 2015/0196276 A1 * | 7/2015 | Seo | B06B 1/0215 600/459 |
| 2017/0299554 A1 * | 10/2017 | Bondurant | G01N 29/2412 |
| 2017/0333946 A1 | 11/2017 | Cegla | B06B 1/04 |
| 2018/0356369 A1 | 12/2018 | Tamura | G01N 29/2412 |
| 2020/0393417 A1 | 12/2020 | Lopez Jauregui | G01N 29/11 |
| 2021/0341432 A1 | 11/2021 | Ren | G01N 29/2412 |

FOREIGN PATENT DOCUMENTS

| | | |
|---|---|---|
| CN | 105975728 A | 6/2016 |
| CN | 107064311 A | 8/2017 |
| CN | 107206424 A | 9/2017 |
| CN | 108375433 A | 8/2018 |
| JP | 2000146923 A | 5/2000 |
| JP | 2010025812 A | 2/2010 |
| JP | 2014102157 A | 6/2014 |

\* cited by examiner

ELECTROMAGNETIC ULTRASONIC DOUBLE-WAVE TRANSDUCER

This application is a Divisional Application of U.S. Ser. No. 17/266,127, filed on Feb. 5, 2021, which is the National Stage Application of PCT/CN2018/112179, filed on Oct. 26, 2018, which claims priority to Chinese Patent Application No. 201810893704.4, filed on Aug. 8, 2018, all of which are incorporated by reference for all purposes as if fully set forth herein.

FIELD OF THE INVENTION

The invention relates to the technical field of ultrasonic inspection, specifically relating to an electromagnetic ultrasonic double-wave transducer.

BACKGROUND OF THE INVENTION

In the field of ultrasonic inspection, it is sometimes necessary to use two modes of waves to accurately detect a part for inspection for certain material properties, dimensions, or defects. For example, in the detection of the nodularity of spheroidal graphite cast iron, if there is only one mode of waves, it is not easy to distinguish whether the change in the time-of-flight is from a change in the thickness of the sample or from a change in the speed of the ultrasonic wave itself, which greatly affects the effectiveness of the inspection. For example, in the assessment of the tensile force of the bolt, if only one mode of ultrasonic wave is adopted, it cannot be known whether the time-of-flight of the ultrasonic wave is from the change of the part's dimension or the change of the speed of the ultrasonic wave caused by the tensile stress of the bolt. Thus, the bolt tension cannot be detected by an ultrasonic method.

In order to generate ultrasonic waves of two different modes, the open literature 1 (NDT&E International 42 (2009) 164-169) mentioned that the ultrasonic longitudinal wave generates mode-converted transverse wave on the reflection bottom surface of the part to be measured by employing a specially designed piezoelectric ultrasonic transducer; the open literature 2 (Ultrasonics 54 (2014) 914-920) mentions that an electromagnetic ultrasonic transverse wave transducer generates mode-converted longitudinal wave at the reflection bottom of the part to be tested by using a high-power source for excitation and a multiple averaging method; the open literature 3 (Vol. 17 (1996) No. 6 662-665, *Chinese Journal of Scientific Instrument*) mentions that the ultrasonic longitudinal waves and transverse waves are respectively generated in the testing part by adopting two piezoelectric transducers in combination; the open literature 4 (U.S. Pat. No. 8,511,165B2) mentions the use of a piezoelectric transducer in combination with an electromagnetic ultrasonic transducer to generate longitudinal and transverse waves, respectively, on the surface of a testing part.

None of the methods in the above open literature can generate both longitudinal wave and transverse wave on the surface of the part to be inspected, causing errors in high-precision inspection, particularly in bolt tension inspection. The piezoelectric transducers referred to in the open literature 1 to 4 need to take the influence of the wedges and the couplant on the propagation time of the ultrasonic wave during the forward and backward propagation of the ultrasonic wave from the piezoelectric wafer to the surface of the part to be tested. Neither of the electromagnetic ultrasonic transducers described in the open literature 2 and 4 can generate ultrasonic longitudinal wave on the surface of a testing part.

SUMMARY OF THE INVENTION

Based on the problems in the prior art, the invention aims at providing an electromagnetic ultrasonic double-wave transducer, which can simultaneously generate longitudinal wave and transverse wave on the surface of a testing part.

Based on the above problems, the invention provides a technical solution:

An electromagnetic ultrasonic double-wave transducer, comprising a shell, and a permanent magnet assembly, a coil, a shielding layer, and a wire which are provided in said shell.

Said permanent magnet assembly comprises a first permanent magnet and a second permanent magnet sleeved on the first permanent magnet. The magnetizing directions of the first permanent magnet and the second permanent magnet are perpendicular to the bottom of said shell, and the magnetic field directions of said first permanent magnet and the second permanent magnet are opposite; a non-conducting non-magnetic bushing material is provided between said first permanent magnet and said second permanent magnet, and upper end faces of said first permanent magnet and said second permanent magnet realize magnetic circuit closing by means of a magnetic circuit closing element.

Said coil is fixed on the bottom of said shell and is located below said first permanent magnet. Said shielding layer is provided between the lower end of said first permanent magnet and said coil and below said second permanent magnet. One end of said wire is connected to said coil, and the other end is connected to power supply and signal plug.

In one embodiment, said first permanent magnet is cylindrical while said second permanent magnet is annular.

In one embodiment, the inner diameter of said second permanent magnet is 1-15 mm larger than the outer diameter of said first permanent magnet.

In one embodiment, the lower end faces of said first permanent magnet and said second permanent magnet have a height difference from −3 mm to 3 mm.

In one embodiment, said coil is helical, and the outer diameter thereof is larger than the outer diameter of said first permanent magnet and smaller than the inner diameter of said second permanent magnet.

In one embodiment, the non-conductive material is filled between said coil and said shielding layer, and the non-conducting non-magnetic material is filled between said permanent magnet assembly and said shell.

In one embodiment, said shell includes a shell body and a wear plate disposed at the lower end of said shell body.

Based on the above problems, the second technical solution provided by the invention is as follows:

An electromagnetic ultrasonic double-wave transducer, comprising a shell, and a permanent magnet assembly, a coil, a shielding layer, and a wire which are provided in said shell. Said coil is fixed on the bottom of said shell and is located below said permanent magnet assembly; said shielding layer is arranged between said permanent magnet assembly and said coil; one end of said wire is connected to said coil while the other end thereof is connected to power and signal plug; said permanent magnet assembly comprises a third permanent magnet and a fourth permanent magnet wherein the fourth permanent magnet are arranged side by side with said third permanent magnet and located on two sides of the width direction of said third permanent magnet, and said fourth permanent magnet and said third permanent magnet are arranged at intervals and said intervals are made of non-conducting non-magnetic bushing material; the upper end faces of said third permanent magnet and said fourth permanent magnet realize magnetic circuit closing by means of a magnetic circuit closing element.

In one embodiment, the cross sections of said third permanent magnet and said fourth permanent magnet are rectangular.

In one embodiment, said coil is butterfly shaped.

In one embodiment, the non-conductive material is filled between said coil and said shielding layer, and the non-conducting non-magnet-conduction material is filled between said permanent magnet assembly and said shell.

In one embodiment, said shell includes a shell body and a wear plate disposed at the lower end of said shell body.

Compared with the prior art, the invention has following advantages;

By adopting the technical solution of the invention, the ultrasonic transducer can simultaneously excite longitudinal waves and transverse waves on the surface of a testing part, and the two modes of ultrasonic waves are used for detecting physical quantities such as material properties like elastic modulus of materials, defects, length, stress and the like, thereby the measurement error caused by the time delay of the piezoelectric ultrasonic wedge and the coupling agent is avoided, the detection error possibly caused by the mode conversion of the ultrasonic waves is also avoided, and the detection precision is improved.

BRIEF DESCRIPTION OF THE DRAWINGS

In order to more clearly illustrate the technical solutions of the embodiments of the invention, the drawings required to be used in the description of the embodiments are briefly introduced below, the drawings in the description are only some embodiments of the invention, and it is obvious for those skilled in the art that other drawings can be obtained according to the drawings without creative efforts.

Wherein:
1. Shell; 1-1. Shell body; 1-2. Wear plate;
2. The first permanent magnet;
3. The second permanent magnet;
4. Coil;
5. Shielding layer;
6. Wire;
7. Power supply and signal plug;
8. Magnetic circuit closing element;
9. Non-conducting non-magnetic bushing material;
10. Non-conductive material;
11. Non-conducting non-magnetic material;
12. The third permanent magnet;
13. The fourth permanent magnet.

DETAILED DESCRIPTION OF THE PREFERRED EMBODIMENTS

The above-described solution is further illustrated below with reference to specific embodiments. It should be understood that these embodiments are for illustrative purposes and are not intended to limit the scope of the invention. The conditions used in the embodiments may be further adjusted according to the conditions of the particular manufacturer, and the conditions not specified are generally conditions used in routine experiments.

Figure 1:
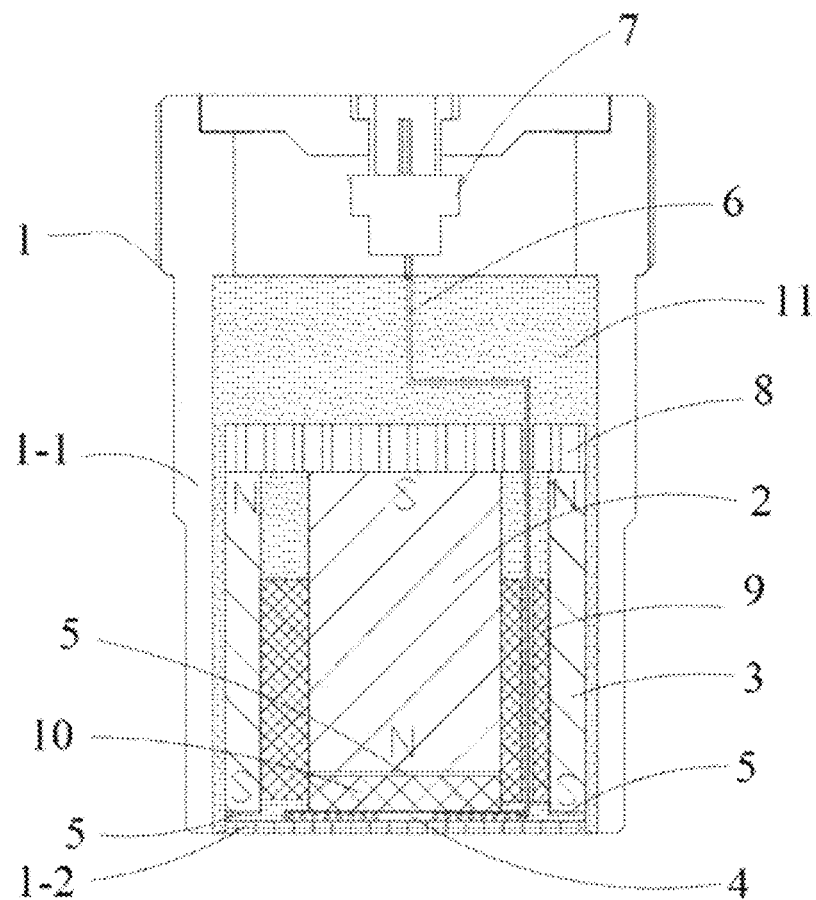
FIG. 1 is a schematic structural diagram illustrating the embodiment 1 of the electromagnetic ultrasonic double-wave transducer in the invention.

As is shown in FIG. 1, a schematic structural diagram of the embodiment in the invention provides an electromagnetic ultrasonic double-wave transducer, comprising a shell 1, and a permanent magnet assembly, a coil 4, a shielding layer 5, and a wire 6 which are provided in the shell 1.

The permanent magnet assembly comprises a first permanent magnet 2 and a second permanent magnet 3 sleeved on the first permanent magnet 2. The magnetizing directions of the first permanent magnet 2 and the second permanent magnet 3 are perpendicular to the bottom of the shell 1, and the magnetic field directions of the first permanent magnet 2 and the second permanent magnet 3 are opposite. A non-conducting non-magnetic bushing material 9 is provided between the first permanent magnet 2 and the second permanent magnet 3, and upper end faces of the first permanent magnet 2 and the second permanent magnet 3 realize magnetic circuit closing by means of a magnetic circuit closing element 8.

Said coil 4 is fixed on the bottom of said shell 1 and is located below said first permanent magnet 2. Said shielding layer 5 is provided between the lower end of said first permanent magnet 2 and said coil 4 and below said second permanent magnet 3. One end of said wire 6 is connected to said coil 4, and the other end is connected to a power supply and signal plug 7.

In this embodiment, the magnetic circuit closing element 8 is made of mild steel or ferrite with a thickness greater than 3 mm. The non-conducting non-magnetic bushing material 9 is made of plastic, rubber or polymer material, such as bakelite.

The inner diameter of said second permanent magnet 3 is 1-15 mm larger than the outer diameter of said first permanent magnet 2, and said coil 4 is helical, and the outer diameter thereof is larger than the outer diameter of said first permanent magnet 2 and smaller than the inner diameter of said second permanent magnet 3. The lower end face of the first permanent magnet 2 can be flush with that of the second permanent magnet 3, and they also can have a height difference of less than 3 mm, which means that the lower end face of the first permanent magnet 2 is located above that of the second permanent magnet 3, or is located below that of the second permanent magnet 3.

In this embodiment, the shielding layer 5 is a highly conductive copper sheet or silver sheet, and is attached to the lower ends of the first permanent magnet 2 and the second permanent magnet 3.

In order to further optimize the implementation effect of the invention, the non-conductive material 10 is filled between said coil 4 and said shielding layer 5, such as air, resin and non-conductive soft magnetic material; the non-conducting non-magnetic material is filled between said permanent magnet assembly and said shell 1, i.e., epoxy resin.

In this embodiment, said coil 4 is made of double-layer PCB board or wound by enameled wire.

In this embodiment, said shell 1 includes a shell body 1-1 and a wear plate 1-2 disposed at the lower end of said shell body 1-1; the wear plate 1-2 is made of ceramic wafer or epoxy plate and the shell body 1-1 is made of stainless steel, aluminum alloy or red copper material; the power supply and signal plug 7 is fixed at the upper part of the shell body 1-1.

Figure 2:
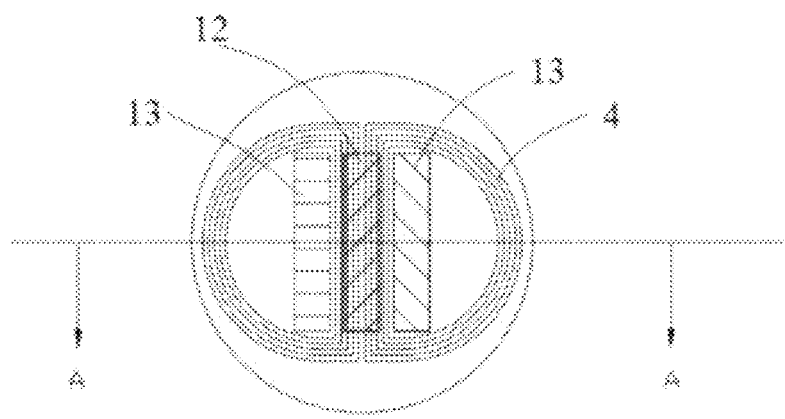
FIG. 2 is a schematic structural diagram of embodiment 2 of the invention.
Figure 3:
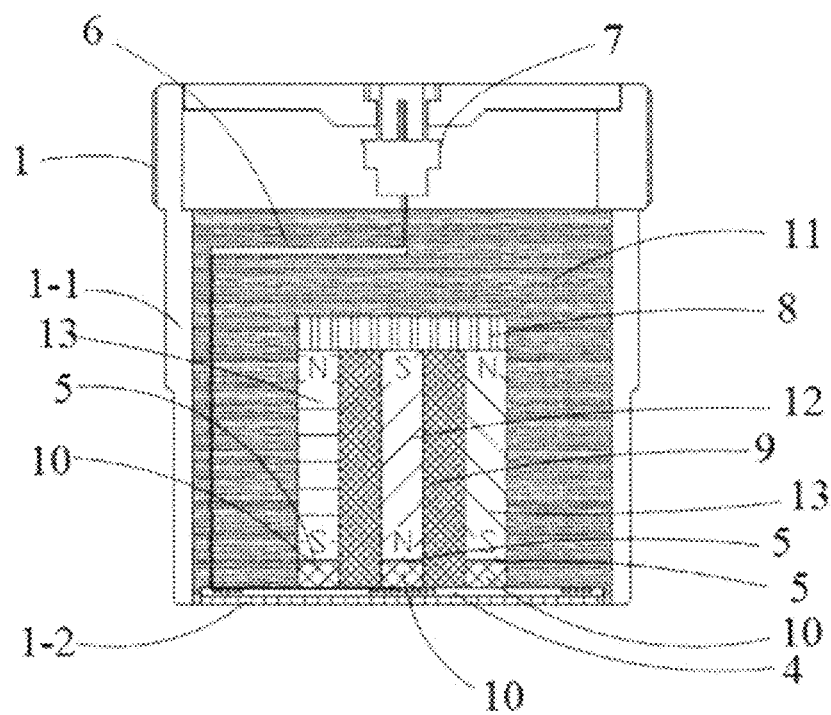
FIG. 3 is a sectional view of FIG. 2 along line A-A.

As is shown in FIGS. 2 and 3, the schematic structural diagram of embodiment 2 is the same as the embodiment 1 except structure of the permanent magnet assembly and structure of the coil 4; the permanent magnet assembly comprises a third permanent magnet 12 and a fourth permanent magnet 13 wherein the fourth permanent magnet 13 are arranged side by side with said third permanent magnet 12 and located on two sides of the width direction of said third permanent magnet 12, and between said fourth permanent magnet 13 and said third permanent magnet 12 are non-conducting non-magnetic bushing material 9;

In this embodiment, the cross sections of said third permanent magnet 12 and said fourth permanent magnet 13 are rectangular and said coil 4 is butterfly shaped.

In the implementation, the first permanent magnet 2, the second permanent magnet 3, the third permanent magnet 12 and the fourth permanent magnet 13 are all made of NdFeB materials.

The electromagnetic ultrasonic transducer can simultaneously excite vertical downward-transmitted ultrasonic transverse waves and ultrasonic longitudinal waves on the near surface of a conductive or magnetic testing part such as low-carbon steel, aluminum alloy and the like, and the amplitude of the longitudinal waves excited by said electromagnetic ultrasonic transducer can reach 20% to 30% of the transverse waves at most in a test with a matched instrument. While the conventional electromagnetic ultrasonic transducer can hardly excite longitudinal wave.

For example, the Young's modulus and the Poisson's ratio of isotropic materials were detected by using the electromagnetic ultrasonic double-wave transducer of embodiment 1.

In isotropic materials, the elasticity modulus E and Poisson's ratio v are related to the velocity of the longitudinal wave $C_l$ and the transverse wave $C_s$ as follows:

$$L = \frac{\rho J_z^9 /: [^9 -; 0}{[^9 - 8} \quad (1)$$

$$v = \frac{[^9 - 9}{9/[^9 - 80} \quad (2)$$

where T is defined as $T = C_l/C_s$, ρ is the density, and taken $7.87 \times 10^3$ kg/m³ for 20 #carbon steel.

Therefore, the Young's modulus and the Poisson's ratio of the material can be estimated by detecting the longitudinal wave velocity, the transverse wave velocity and the density of the material.

Figure 4:
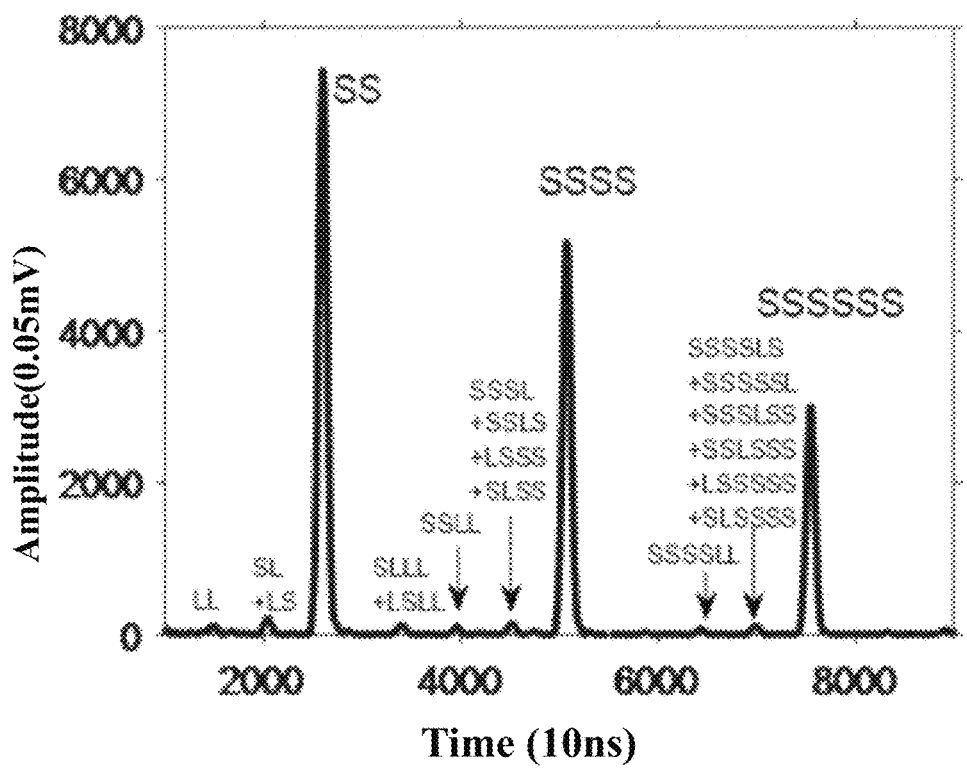
FIG. 4 illustrates that the electromagnetic ultrasonic double-wave transducer of embodiment 1 simultaneously excites transverse wave signals and longitudinal wave signals when detecting the Young's modulus and the Poisson's ratio of isotropic materials.
Figure 5:
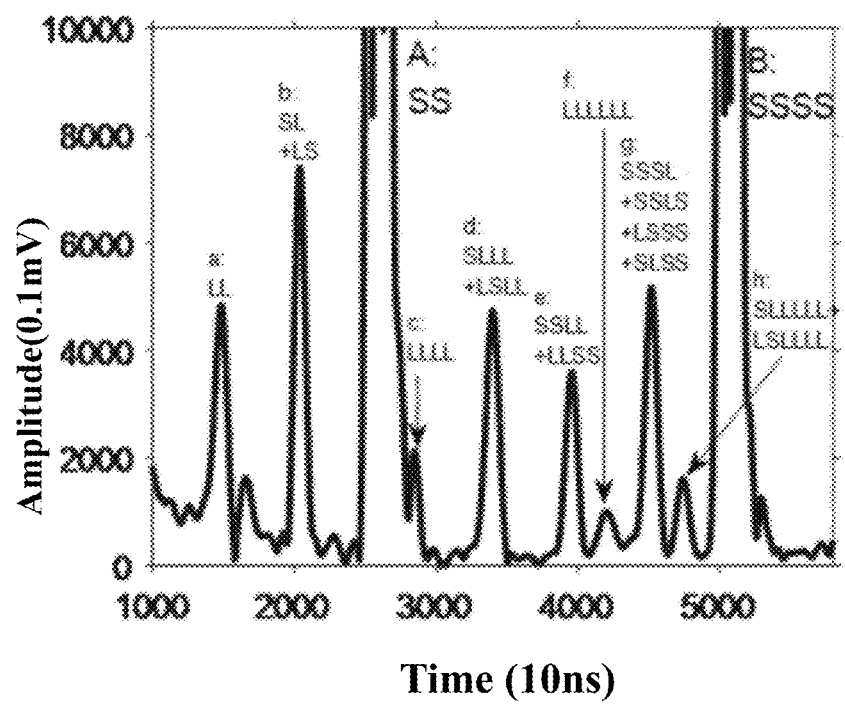
FIG. 5 is an enlarged view illustrating the gain of the electromagnetic ultrasonic double-wave transducer of embodiment 1 simultaneously excites transverse wave signals and longitudinal wave signals when detecting the Young's modulus and the Poisson's ratio of isotropic materials.

A hand-held high-power ultrasonic testing instrument PREMAT-HS200 manufactured by Suzhou Phaserise Technology Co., Ltd. is used as an electromagnetic ultrasonic pulser/receiver equipped with the electromagnetic ultrasonic double-wave transducer of the invention. The testing part is selected from a CSK-IIA standard sample according to JB/T 4730-2005 standard. The sample dimension is 300 mm long, 60 mm wide and 40 mm in height The electromagnetic ultrasonic transducer is placed in the middle of the upper surface of the sample to be tested, and is 170 mm away from the left edge of the sample, and 35 mm away from the upper edge. The test frequency is 4 MHz, the excitation voltage 1200 Vpp, the display delay 10 μs, the sampling time 80 μs, the sampling speed 100 MS/s, and the repetition rate 200 Hz. The test data for the automatic gain is shown in FIG. 4. Increasing the gain further on the basis of FIG. 4 results in FIG. 5. In FIG. 5, multiple periodic echoes and mode-converted waves are labeled, and it can be seen that the electromagnetic ultrasonic double-wave transducer of the invention excites longitudinal waves (first echo is LL) and transverse waves (first echo is SS) simultaneously on the surface of the sample.

Calculations from equations (1) and (2) using the data in table 1 lead to:

$$E = 2.1226 \times 10^{11} \text{ Pa} \quad (3)$$
$$v = 0.285 \quad (4)$$

The results are very close to the nominal value of the sample.

TABLE 1

Time-of-flight of longitudinal wave and transverse wave excited on surface of the testing part.

| | LL | SS | SSSS | SSSSSS | Average wave velocity of transverse wave |
|---|---|---|---|---|---|
| Time (ns) | 1354.13 | 24707 | 49402 | 74097 | 3239.5 m/s |
| Sound velocity of longitudinal Waves (m/s) | 5907.85 | — | — | — | — |

The transducer of the invention can be used for accurate detection of bolt tension. According to some open literature, the bolt stress is a linear function of the ratio of longitudinal wave time-of-flight and transverse wave time-of-flight.

Figure 6:
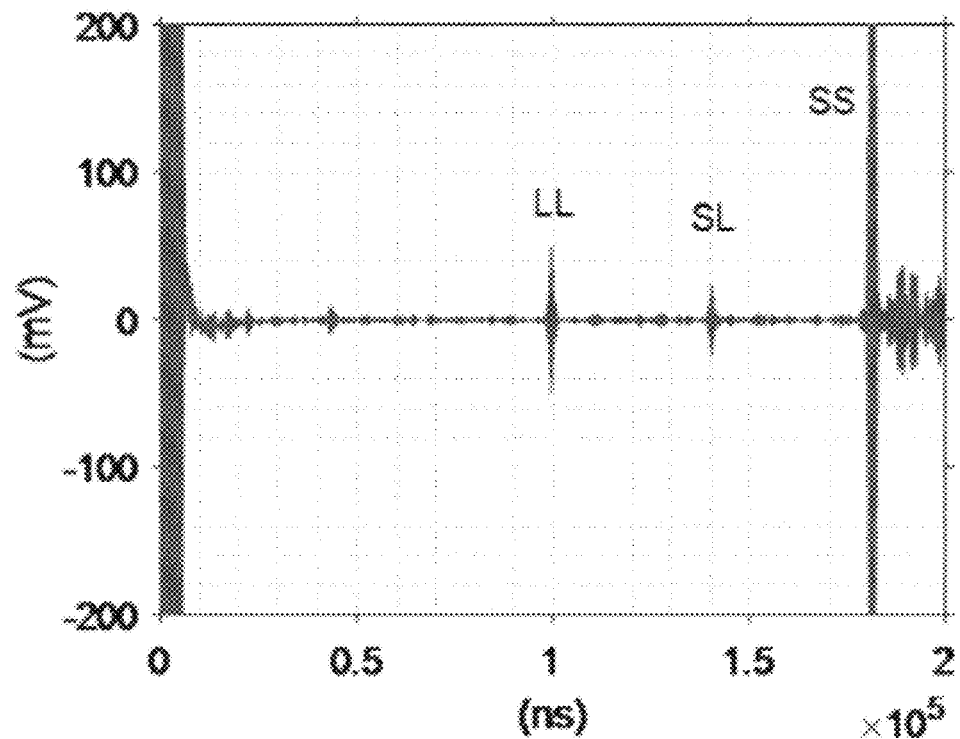
FIG. 6 is the longitudinal wave signals and the transverse wave signals generated simultaneously when the electromagnetic ultrasonic double-wave transducer of embodiment 1 detects tension of a bolt.
Figure 7:
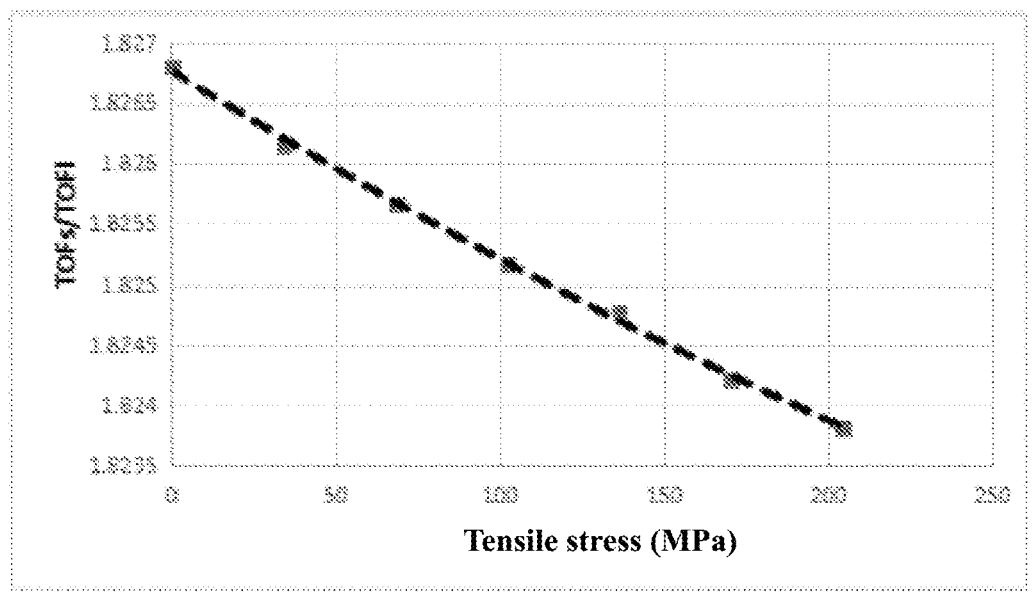
FIG. 7 illustrates that time-of-flight ratio of the transverse wave sound to the longitudinal wave sound generated simultaneously when the electromagnetic ultrasonic double-wave transducer of embodiment 1 is used for bolt tension detection is in one-to-one relationship.

For the bolt with calibrated material parameters, the tensile stress applied to the bolt can be calculated as long as $TOF_s$ and $TOF_l$ can be accurately measured. The transducer used by the invention can simultaneously excite longitudinal waves and transverse waves on the inspection surface end of the bolt. FIG. 6 shows that longitudinal wave (LL) and transverse wave (SS) signals are simultaneously excited on the tested surface end of a bolt with 42 mm nominal diameter by using the electromagnetic ultrasonic double-wave transducer of the invention. Thus, $TOF_s$ and $TOF_l$ values can be simultaneously and accurately measured. FIG. 7 is the experimental raw data of $TOF_s$ and $TOF_l$ ratio versus tensile stress applied to the 42 mm-nominal-diameter bolt in FIG. 6. during calibration by a hydraulic bolt tensile machine. As can be seen from FIG. 7, the correspondence between the two is a relatively smooth monotonous function in one-to-one correspondence, and the corresponding bolt tensile stress error range is relatively small. Professional data processing methods can also be applied to process the one-to-one monotone function shown in the FIG. 7, so as to obtain higher inspection precision for the bolt tensile stress.

For instance, Young's modulus and the Poisson's ratio of isotropic materials were measured by using the electromagnetic ultrasonic double-wave transducer of embodiment 2.

Figure 8:
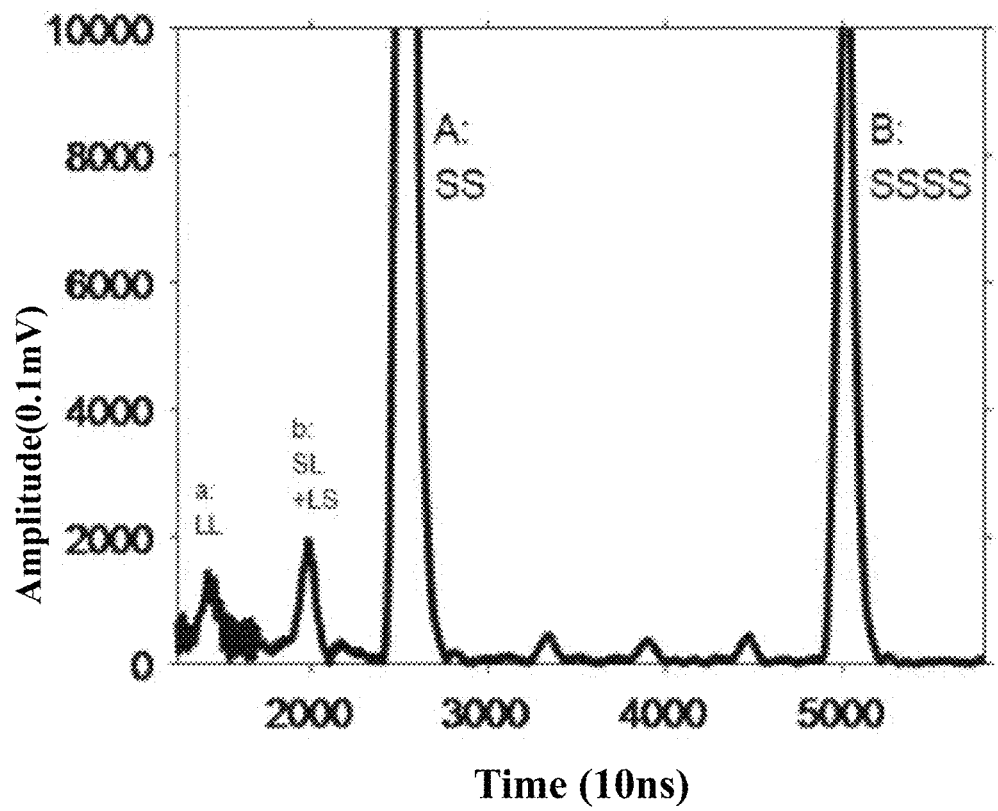
FIG. 8 is an enlarged view illustrating the gain of the electromagnetic ultrasonic double-wave transducer of embodiment 2 simultaneously excites transverse wave signals and longitudinal wave signals when detecting the Young's modulus and the Poisson's ratio of isotropic materials.

After selecting the same sample and measurement parameters as in embodiment 1, The FIG. 8 in embodiment 2 corresponds to FIG. 5 of embodiment 1. In FIG. 8, the amplitude of the longitudinal wave generated simultaneously with the transverse wave on the surface of the testing sample is about one third of that of the embodiment 1, but the final detection results of the Young's modulus and the Poisson's ratio are not much different from that of the embodiment 1. In addition, the electromagnetic ultrasonic double-wave transducer of embodiment 2 is directional, and is very advantageous for detecting the sound velocity of transverse waves and the longitudinal waves in each direction of a material having a regular texture, such as a cold-rolled steel sheet or an aluminum sheet.

The above embodiments are provided only for illustrating the technical concepts and features of the invention, and the purpose of the invention is to provide those skilled in the art with the understanding of the invention and to implement the invention, and not to limit the scope of the invention. All equivalent changes and modifications made according to the spirit of the invention should all fall within the protection scope of the invention.

The invention claimed is:

1. An electromagnetic ultrasonic double-wave transducer, comprising a shell (1), and a permanent magnet assembly, a coil (4), a shielding layer (5), and a wire (6) which are provided in said shell (1);
    wherein
    said coil (4) is configured to be fixed on a bottom of said shell (1) and is configured to be located below said permanent magnet assembly;
    said shielding layer (5) is configured to be arranged between said permanent magnet assembly and said coil (4);
    one end of said wire (6) is configured to be connected to said coil (4) while the other end thereof is configured to be connected to a power supply and signal plug (7);
    said permanent magnet assembly comprises a third permanent magnet (12) and a fourth permanent magnet (13) wherein the fourth permanent magnet (13) is configured to be arranged side by side with said third permanent magnet (12) and located on two sides of a width direction of said third permanent magnet (12), and said fourth permanent magnet (13) and said third permanent magnet (12) are configured to be arranged at intervals and said intervals are made of a first non-conducting non-magnetic material (9);
    said first non-conducting non-magnetic material (9) is configured to be only disposed in between the third permanent magnet (12) and the fourth permanent magnet (13); and
    an upper end face of said third permanent magnet (12) and an upper end face of said fourth permanent magnet (13) realize magnetic circuit closing by means of a magnetic circuit closing element (8),
    wherein the electromagnetic ultrasonic double wave transducer is configured for simultaneously exciting vertical downward-transmitted ultrasonic transverse waves and ultrasonic longitudinal waves on a surface of a conductive or magnetic testing subject.

2. The electromagnetic ultrasonic double-wave transducer of claim 1, wherein cross sections of every magnet of said third permanent magnet (12) and said fourth permanent magnet (13) are rectangular.

3. The electromagnetic ultrasonic double-wave transducer of claim 1, wherein said coil (4) is butterfly shaped.

4. The electromagnetic ultrasonic double-wave transducer of claim 1, wherein a non-conductive material (10) is filled between said coil (4) and said shielding layer (5), and a second non-conducting non-magnetic material (11) is configured to be filled between said permanent magnet assembly and said shell (1).

5. The electromagnetic ultrasonic double-wave transducer of claim 1, wherein said shell (1) includes a shell body (1-1) and a wear plate (1-2) configured to be disposed at a lower end of said shell body (1-1).

* * * * *